United States Patent [19]

Kraus

[11] Patent Number: 4,537,093
[45] Date of Patent: Aug. 27, 1985

[54] FIXED RATIO TRACTION ROLLER TRANSMISSION

[75] Inventor: Charles E. Kraus, Austin, Tex.
[73] Assignee: Excelermatic Inc., Austin, Tex.
[21] Appl. No.: 545,833
[22] Filed: Oct. 27, 1983
[51] Int. Cl.³ ............................................. F16H 13/08
[52] U.S. Cl. ........................................ 74/798; 74/751
[58] Field of Search ................. 74/206, 798, 208, 751, 74/785

[56] References Cited

U.S. PATENT DOCUMENTS

| | | | |
|---|---|---|---|
| 3,490,311 | 1/1970 | Okabe | 74/798 |
| 3,793,907 | 2/1974 | Lakamura | 74/798 |
| 4,052,915 | 10/1977 | Kraus | 74/798 |
| 4,215,595 | 8/1980 | Kraus | 74/208 |
| 4,440,043 | 4/1984 | Kraus | 74/798 |
| 4,454,788 | 6/1984 | Kraus | 74/798 |
| 4,471,667 | 9/1984 | Kraus | 74/798 |

FOREIGN PATENT DOCUMENTS

| | | | |
|---|---|---|---|
| 13761 | 12/1965 | Japan | 74/798 |
| 47703 | 3/1977 | Japan | 74/798 |
| 39873 | 3/1983 | Japan | 74/798 |

Primary Examiner—William L. Freeh
Attorney, Agent, or Firm—Klaus J. Bach

[57] ABSTRACT

A traction roller transmission having a number of traction rollers arranged in an annular space between, and in engagement with, a sun roller structure and a traction ring structure for the transmission of motion therebetween includes sun roller and traction ring structures at least one of which has two concentric sleeves provided with complementary conical surfaces arranged opposite, and spaced from, one another and a plurality of bearing balls disposed in the space between the sleeves with an axial cam structure arranged axially adjacent one of the sleeves and adapted to force this sleeve into tighter engagement with the outer sleeve when a torque is transmitted through the transmission, thereby radially expanding the sleeves causing firm engagement of the traction rollers with the sun roller and traction ring structures.

13 Claims, 3 Drawing Figures

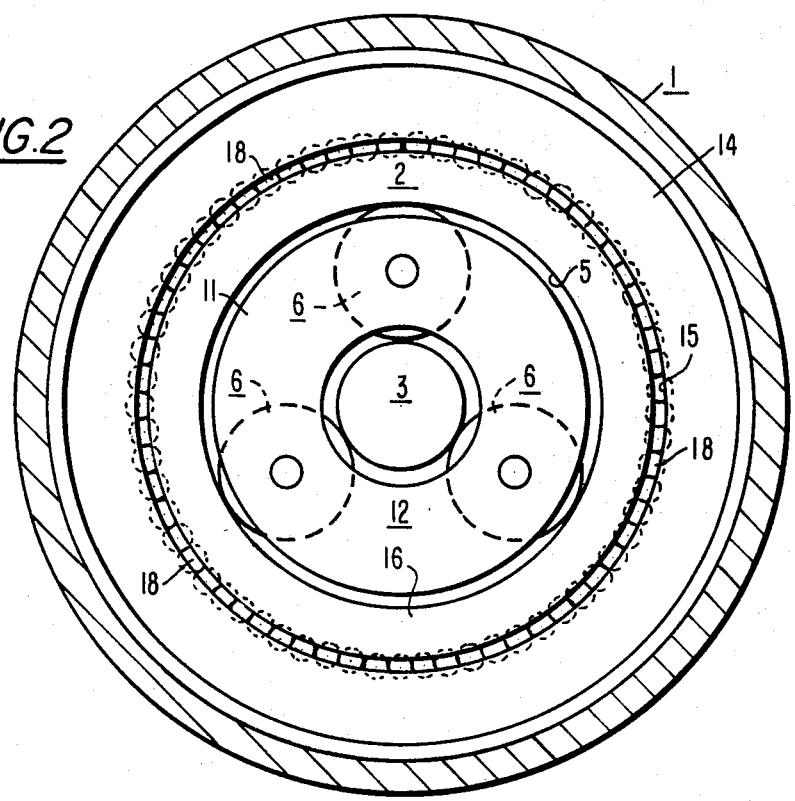
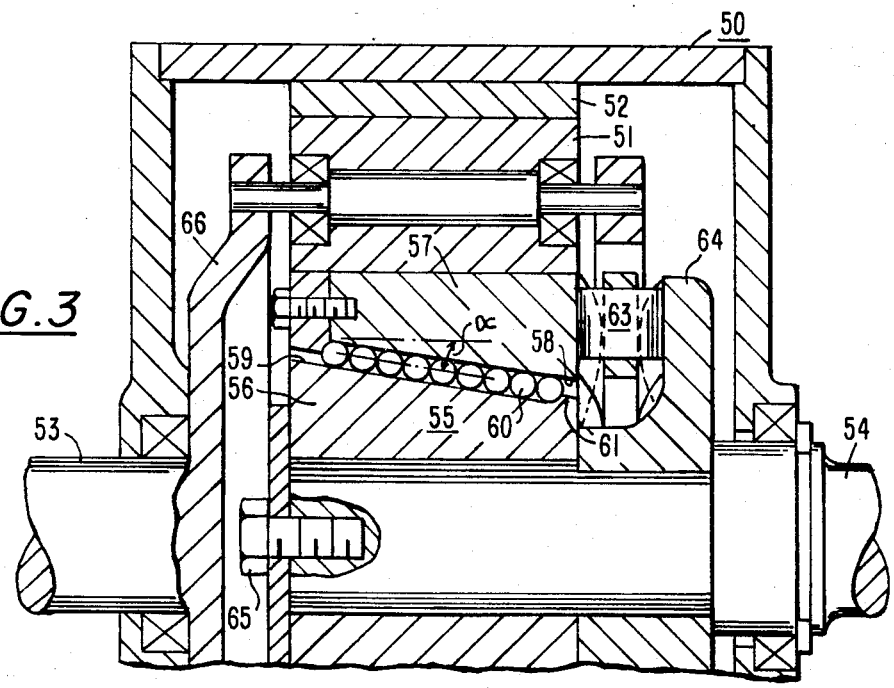

FIXED RATIO TRACTION ROLLER TRANSMISSION

BACKGROUND OF THE INVENTION

The invention relates to planetary type, fixed ratio traction roller transmissions in which the contact forces applied to the traction surfaces of the transmission for the transmission of motion are dependent on the torque transmitted through the transmission.

Basic traction roller transmissions are described, for example, by Harold A. Rothbart in "Mechanical Design and Systems" Handbook, pages 14'-8 and 14-9, McGraw-Hill, New York, 1964. In the relatively simple arrangements of FIGS. 14.6 and 14.7 wherein the outer rings of planetary-type transmissions are slightly undersized to compress the roller arrangements therein, the surface pressure on the traction surfaces is always the same, that is, it is always at the highest value even if only a small torque is transmitted through the transmission. As a result, wear and losses are always relatively high. In the arrangements shown on page 14-8 of said handbook, means are provided for engaging the traction surfaces with each other with forces which are dependent on the torque transmitted through the transmission.

It has been proposed to provide expandable sun roller structures provided with Belleville rings which, when axially compressed by torque-operated axial cams, were flattened to thereby grow radially and force the traction rollers into firm engagement with the traction ring (U.S. Ser. No. 281,983 assigned to the assignee of the present invention).

In another arrangement (descibed in U.S. Ser. No. 422,533, which is also assigned to the assignee of the present invention), a tapered ball screw structure is so associated with the sun roller or the traction ring that a torque transmitted through the transmission causes the tapered ball screw structure to expand radially for forcing the planetary traction rollers into firm engagement with the traction ring and the sun roller. However, while such an arrangement is quite simple, problems have arisen which limit the application of such transmissions. Especially, the transmission of larger torques is problematic as, in order to expand or compress the traction surface ring, the ball wedging angle must be relatively small so that the ring will remain locked under tension when the torque is reduced, especially if some torque is still applied.

SUMMARY OF THE INVENTION

In a traction roller transmission in which a number of traction rollers are arranged in an annular space between, and in engagement with, a sun roller structure and a traction ring structure for the transmission of motion therebetween, the sun roller or the traction ring structure includes two concentric sleeves provided with complementary conical surfaces arranged opposite, and spaced from, one another with a plurality of bearing balls disposed in the space between the sleeves which facilitate axial and rotational movement of one of the sleeves relative to the other. An axial cam structure is so arranged axially adjacent one of the sleeves that the sleeves are forced into tighter engagement with one another when a torque is transmitted through the transmission, thereby causing radial expansion of the sleeves and firm engagement of the traction rollers with the sun roller and traction ring structures.

The cone angle is at least 5° to prevent locking of the sleeves but preferably not more than 15° to avoid excessive axial loads and uneven force distribution.

SHORT DESCRIPTION OF THE DRAWINGS

FIG. 2 is a cross-sectional view taken along line II—II of FIG. 1; and

FIG. 3 is an axial cross-sectional view of a traction roller transmission having its loading structure associated with the sun roller.

DESCRIPTION OF THE PREFERRED EMBODIMENTS

Figure 1:
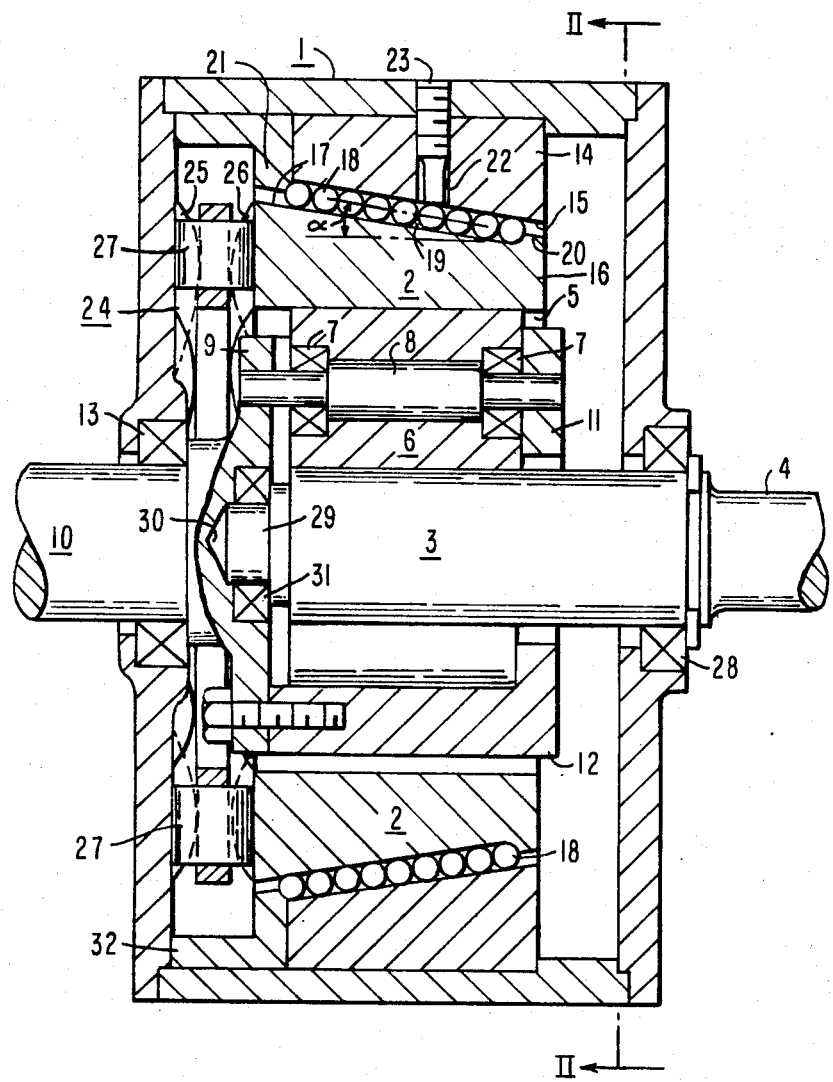
FIG. 1 is an axial cross-sectional view of a traction roller transmission having a loading structure associated with the traction ring.

As shown in FIGS. 1 and 2, the traction roller transmission includes, in a housing 1, a traction ring structure 2, a sun roller 3 centrally disposed within the traction ring structure 2 and mounted on, or being part of, an input shaft 4. The sun roller 3 has an outer diameter substantially smaller than the inner diameter of the traction ring structure 2 such that an annular path 5 is formed between the traction ring structure 2 and the sun roller 3. Planetary traction rollers 6 are disposed in the annular path 5 between the traction ring structure 2 and the sun roller 3 and in engagement with the traction ring structure 2 and the sun roller 3. The planetary traction rollers 6 are rotatably supported by bearings 7 on shafts 8 extending between the flange 9 of an output shaft 10 and the opposite support plate 11 of a support cage 12 mounted on the output shaft flange 9 by bolts. The output shaft 10 is supported in the housing 1 by a bearing 13 and the input shaft 4 is supported in the housing 1 by a bearing and by the traction rollers 6, or alone by the traction rollers 6.

The traction ring structure 2 consists of a back-up sleeve 14 mounted in the housing 1 and having a slightly conical inner surface 15 and a traction sleeve 16 having a conical outer surface 17 corresponding to the conical inner surface 15. Both conical inner and outer surfaces 15, 17 are spaced from one another.

Bearing balls 18 are arranged in the space 19 between the back-up sleeve 14 and the traction sleeve 16, which bearing balls 18 facilitate axial translation of the traction sleeve 16 within the back-up sleeve 14. The traction sleeve 16 has a radially outwardly projecting lip 20 at its small outer diameter axial end and the back-up sleeve 14 has a radially inwardly projecting lip 21 at its larger inner diameter axial end adapted to retain the bearing balls 18 in the annular space 19 between the back-up sleeve 14 and the traction sleeve 16. A radial fill hole 22 is provided in the back-up sleeve 14 for inserting the bearing balls 18, the fill hole 22 being closed by a removable plug 23.

Axially adjacent the larger diameter outer end of the traction sleeve 16 there is provided a cam structure 24 consisting of axial cam lobes 25 associated with the housing 1 and opposite axial cam lobes 26 associated with the traction sleeve 16 with rollers 27 disposed between the opposite axial cam lobes 25, 26. A plurality of such cam lobes are provided with lobe surfaces disposed at both sides adjacent each roller 27 so that relative rotation of the traction sleeve 16 in either direction will force the traction sleeve 16 axially into the back-up sleeve 14 for axial compression of the traction sleeve 16 into engagement with the traction rollers 6 therein and of the traction rollers 6 into engagement wth the sun roller 3.

The sun roller 3, together with the input shaft 4, is supported at one end in the housing 1 by an anti-friction bearing 28 and, at the other end, has an axial projection 29 which is received in a cavity 30 in the output shaft 10 and is supported therein by an anti-friction bearing 31 so as to firmly support the input shaft 4 also when the sun roller 3 is not engaged by the traction rollers 6.

The traction roller transmission provided hereby is quite simple and easy to manufacture. The balls filled into the space 19 between the back-up sleeve 14 and the traction sleeve 16 provide for friction-free axial and rotational movement of the traction sleeve within the back-up sleeve so that a torque transmitted through the transmission and generating a corresponding reaction torque on the traction sleeve 16 will cause the reaction sleeve to be forced by the cam structure 24 axially into the back-up sleeve for firm engagement of the traction rollers 6 with the sun roller 3 and the traction sleeve 16.

Preferably, there are provided at least three traction rollers 6, all spaced equally around the sun roller, although only one is shown in the cross-sectional view of FIG. 1.

In order to permit filling of the bearing balls 18 into the space 19 between the back-up sleeve 14 and the traction sleeve 16 there may be provided a retaining ring 32 as shown in the lower part of FIG. 1—in place of the plugged fill hole 22.

It is further noted the cone angle α of the inner surface of the back-up sleeve 14 and the outer surface of the traction sleeve 16 should be at least 5° to avoid locking of the traction sleeve 16 within the back-up sleeve 14 and the angle α should be no greater than 15° to avoid uneven stress deflection and the need for large axial forces, that is, relatively flat axial cam lobes 25 and 26.

In the arrangement as shown in FIGS. 1 and 2, the loading means is shown associated with the traction ring structure 52. However, if the sun roller is sufficiently large, the loading means may just as well be associated with the sun roller as shown in FIG. 3. Here, a housing 50 again encloses traction rollers 51 arranged between a traction sleeve 52 and mounted for rotation with an output shaft 53 by means of a flange member 66, while the input shaft 54 carries the sun roller structure 55. The sun roller structure 55 consists of an inner conical sleeve 56 mounted on the input shaft 54 and an outer sleeve 57 having a conical inner surface 58 arranged opposite of, and spaced from, the conical outer surface 59 of the inner sleeve 56, the space between the conical inner and outer surfaces being again filled with bearing balls 60. The bearing balls 60 are retained by the circumferential lip 61 on the inner sleeve 56 and the retaining ring 62 mounted on the outer sleeve 57. A cam structure 63 is provided between a flange 64 mounted on the input shaft 54 and the axial end of the outer sleeve 57 having the smaller inner diameter so as to force the outer sleeve 57 onto the inner sleeve 56 when a torque is transmitted through the transmission. This causes expansion of the outer sleeve 57 thereby forcing the traction rollers 50 into firm engagement with the sun roller structure 55 and the traction ring 52 for transmitting motion from the sun roller structure 55 to the traction ring 52. Traction rollers 54 are supported on a drive bell 56 which is mounted on the output shaft 53. It is noted, however, that torque may be transmitted in either direction, that is, what is termed input shaft may be output shaft and vice versa.

This arrangement is suitable for use where the sun roller structure may be relatively large. It is very simple and effectively prevents locking. The sun roller structure may be pre-assembled and readily mounted on the sun roller by means of a retaining bolt 65.

Again, the cone angle at the interface between the inner and outer sleeves is preferably between 5° and 15°.

I claim:

1. A traction roller transmission comprising a traction ring structure having an inner traction surface, a sun roller disposed centrally within said traction ring structure and having a circumferential traction surface, said sun roller having a diameter substantially smaller than the inner diameter of said traction ring structure such that an annular space is formed between the traction surfaces of said sun roller and said traction ring structure and a number of planetary traction rollers rotatably supported in said annular space between, and in engagement with, the traction surfaces of said sun roller and said traction ring structure, said traction ring structure consisting of two concentric sleeves having complementary conical surfaces opposite, and spaced from, one another such that an annular gap is formed therebetween, a plurality of bearing balls disposed in said annular gap so as to facilitate relative axial and rotational motion of said two concentric sleeves, and axial cam means arranged adjacent the radially wider end of said inner sleeve for axially forcing said inner sleeve into said outer sleeve when a torque is transmitted through said transmission thereby to compress said inner sleeve and force the traction rollers into firm engagement with the traction surfaces of said sun roller and said traction ring structure.

2. A traction roller as claimed in claim 1, wherein said complementary surfaces of the inner and outer concentric sleeves have an angle of 5°–15° with respect to the sleeve axis.

3. A traction roller transmission as claimed in claim 1, wherein the outer of said concentric sleeves is associated with a housing enclosing said transmission and wherein coaxial input and output shafts are rotatably supported in said housing, one of said input and output shafts having said sun roller disposed thereon and the other carrying in said housing a cage rotatably supporting said traction rollers for movement therewith.

4. A traction roller transmission as claimed in claim 3, wherein said axial cam structure includes annular cams disposed opposite each other on said housing and said inner sleeve, with bearing rollers disposed therebetween, said cams having lobes arranged circularly and adjacent each side of each bearing roller for the transmission of a torque through said transmission in either direction of operation.

5. A traction roller transmission as claimed in claim 1, wherein the inner concentric sleeve has a radially outwardly projecting lip at its larger diameter end and the outer concentric sleeve has a radially inwardly projecting lip at its inner smaller diameter axial end for retaining said bearing balls within said annular gap.

6. A traction roller transmission as claimed in claim 5, wherein a radial hole is formed in said outer concentric sleeve for introducing bearing balls into the said annular gap, and a plug is provided for closing said radial hole.

7. A traction roller transmission as claimed in claim 5, wherein at least one of said lips is formed by a removable flange adapted to retain said bearing balls in said annular gap.

8. A traction roller transmission comprising a traction ring having an inner traction surface, a sun roller structure disposed centrally within said traction ring and having a circumferential traction surface, said sun roller structure having a diameter smaller than the inner diameter of said traction ring such that an annular space is formed between the traction surfaces of said sun roller structure and said traction ring, and a number of planetary traction rollers rotatably supported in said annular space between, and in engagement with, the traction surfaces of said sun roller structure and said traction ring, said sun roller structure consisting of two concentric sleeves having complementary conical surfaces arranged opposite, and spaced from, one another such that an annular gap is formed therebetween, a plurality of bearing balls disposed in said annular gap so as to facilitate relative axial and rotational motion of said two concentric sleeves, and axial cam means arranged adjacent the radially wider end of said outer sleeve for axially forcing said outer sleeve onto said inner sleeve when a torque is transmitted through said transmission, thereby to expand said outer sleeve and force the traction rollers into firm engagement with the traction surfaces of said traction ring and sun roller structure.

9. A traction roller as claimed in claim 8, wherein said complementary surfaces of the inner and outer concentric sleeves have an angle of 5°–15° with respect to the sleeve axis.

10. A traction roller transmission as claimed in claim 8, wherein said traction ring, said traction rollers and said sun roller structure are arranged in a housing in which coaxial input and output shafts are rotatably supported, one of said input and output shafts having said sun roller structure associated therewith and the other having, within said housing, a cage rotatably supporting said traction roller for movement therewith.

11. A traction roller as claimed in claim 10, wherein said axial cam structure includes annular axial cams disposed opposite each other on the shaft carrying said sun roller structure and on said outer sleeve with bearing rollers disposed therebetween, said cam structure having circularly extending lobes arranged adjacent each side of each bearing roller for forcing said outer sleeve onto said inner sleeve upon transmission of a torque through said transmission in either direction of operation.

12. A traction roller as claimed in claim 8, wherein the inner concentric sleeve has a radially outwardly projecting lip at its larger diameter end and the outer concentric sleeve has a radially inwardly projecting lip at its inner smaller diameter axial end for retaining said bearing balls within said annular gap.

13. A traction roller as claimed in claim 12, wherein at least one of said lips is formed by a removable flange adapted to retain said bearing balls in said annular gap.

* * * * *